Oct. 16, 1956     J. C. STOKES     2,766,483

HEATING CYLINDER FOR INJECTION MOLDING MACHINES AND THE LIKE

Filed Dec. 8, 1952

Inventor
JERRY C. STOKES

By Charles L. Lovercheck
Attorney

United States Patent Office 2,766,483
Patented Oct. 16, 1956

2,766,483

HEATING CYLINDER FOR INJECTION MOLDING MACHINES AND THE LIKE

Jerry C. Stokes, Erie, Pa.

Application December 8, 1952, Serial No. 324,626

2 Claims. (Cl. 18—30)

My invention relates generally to injection molding machines for molding plastic and the like and more particularly to a heating chamber or cylinder for an injection molding machine wherein plastic material is heated and softened as it is forced through the heating cylinder through an injection nozzle attached thereto into molds, the molded material ordinarily being cooled and hardened while under pressure in the mold.

All devices of this character, made in accordance with the teachings of the prior art and with which I am familiar, do not perform in accordance with the specifications set up by the manufacturer of the machine in some respects, especially with respect to heater capacity. This is particularly true in the use of newer high heat resistant materials such as polystyrene, acrylics, polyethylene, and the vinyls. These materials are highly heat resistant and in many machines where they are used, the machines will not cycle repeatedly on certain jobs at the rate specified for the machine. Certain molding machines will not make shots at the manufacturer's rated weight of shot capacity when operated at an optimum cycle. Most notable of these failures in present machines is the failure of a machine to run full capacity shots as specified by the manufacturer of a machine when using the new high heat resistant materials. Most failures are now due to lack of plasticizing capacity or the lack of heating capacity resulting from lack of heat transferability in the heating cylinders of injection molding machines.

In an attempt to properly plasticize the highly heat resistant materials, temperatures in prior heating cylinders have been raised but it has been found that this results in affects to the physical characteristics of the material itself. In cylinders of previous design, it is difficult to control the temperature from one end of the heating cylinder to the other. Spreaderless heating cylinders have been tried but in general, they have a low output capacity and will not handle a large volume of material. In prior cylinders utilizing spreaders, much trouble has been experienced with the spreader. Often, cold material falls to the bottom of the feed chamber in these prior machines and is forced against the end of the spreader with a greater concentration of material below the spreader than above it, causing an unbalanced thrust in a vertical direction which tends to bend the entrance end of the spreader. It is, therefore, necessary to support the spreader at the cold or entrance end of the heating cylinder in prior machines. Webs or fins on the spreader which are lapped to the inside surface of the heating cylinder have been used to support the spreader but it has been found that in time, material is forced between these webs or fins and the inside surface of the cylinder and between the joints in the cylinder itself and temporarily trapped there with the result that the trapped material burns and escapes from time to time, causing discolored streaks in the product of the machine. This also makes quick complete color changes of material impossible and the scrap products are increased, especially where light colored material is used. Considerably difficulty is encountered in present heating cylinders in breakage of parts where the spreader is attached in the cylinder and also in the bolts which hold the cylinder itself together. These failures cause leakage and other undesirable consequences.

Heating cylinders have heretofore been assembled in a sleeve from the rear and the thrust of the ram is taken by collars or flanges which are held to the cylinder by large bolts. The entire thrust load is taken on the bolts and this tends to stretch the bolts, allowing leakage of material between the fitted sections, which material discolors and escapes from time to time. It is almost impossible to remove these bolts after the cylinder has been in use without destroying the bolts, thereby making the replacement thereof difficult.

Other heaters are assembled by inserting the spreader or spreader section from the front of the heating unit into a barrel or sleeve and then screwing or bolting onto the front a plate or nut which takes the full thrust of the plunger. Again, the bolt and nut assembly is under direct load from the ram which strains the threads and often breaks the bolts with ensuing leakage which is especially bad since the joint is at the front or hot end of the heating unit and the plastic material is more fluid.

The maintenance cost of present heating units in injection molding machines is prohibitive. This is especially true with the use of present high heat resistant plastic materials.

Heat dispersion from the heating element to the heated material inside of the cylinder has not been uniform in prior machines. Where a sleeve and liner type construction of a heating unit has been used, there is an air gap or joint between the inner and outer members which causes a demonstrable heat transmission loss approaching twenty percent. This results from the fact that the two parts must be loose enough so that they can be readily assembled and disassembled. These separate parts being of varying thickness of section, they absorb heat and expand and contract at different rates so that no consistent picture of the stresses of the supported construction can be drawn. Because of poor heat transferability on the type of cylinders now in general use, it is necessary to run standard cylinder temperatures of approximately six hundred to six hundred fifty degrees Fahrenheit with the resultant danger of overheating the outer side of the plastic material in the heating unit where it is in contact with the cylinder and, at the same time, failure to properly plasticize the material in the inside of the layer flowing through the heating cylinder or unit. This results in poor physical characteristics of the product, poor flow characteristics, low rate of plasticizing, and often discoloration of the material being molded. The spreader in these prior devices offers maximum resistance to the cold and compacted material directly ahead of the ram entering the heating cylinder. The webs have been placed rather close to the end of the ram in these prior devices so that the material has little time to soften before striking the webs, thereby causing maximum wear, distortion, and bending of the webs. Many of these webs are cracked by the cold hard material in front of the plunger. It has also been found that only about sixty-five percent of the circumference of the heater has been heated in these prior devices due to cold ends of the heating bands or elements necessitated by the clamping devices and terminals.

It is, accordingly, an object of my invention to overcome the above and other defects in present heating units for injection molding machines and it is more particularly an object of my invention to provide a heating cylinder or unit for an injection molding machine which is efficient in operation, economical in cost, economical in maintenance, economical in manufacture, and easy to assemble and disassemble.

Another object of my invention is to provide a heating unit for an injection molding machine which is especially adapted for handling high heat resistant plastic materials such as polystyrene and nylon.

Another object of my invention is to provide a heating unit for a plastic injection molding machine which may be adapted for use on all present injection molding machines.

Another object of my invention is to provide a heating unit or cylinder for an injection molding machine which provides a uniform heat transfer to the material being molded, which has a maximum heat transferred to the material therein over the maximum length and area thereof, which has a uniform wall thickness to give uniform heat dispersion, which operates at minimum cylinder temperatures, and which has a smooth inside construction to permit easy passage of plastic material therein.

Another object of my invention is to provide a heating unit or cylinder for an injection molding machine which utilizes a spreader with a supporting web spaced a sufficient distance from the entrance end of said heating unit so that the entering cold material will be warm and softened by the time it reaches the web to minimize wear thereon and damage thereto.

Another object of my invention is to provide a heating unit or cylinder for an injection molding machine which will run full capacity shots at a rapid rate using the new high heat resistant materials.

Another object of my invention is to provide a heating unit or cylinder for an injection molding machine which has a maximum plasticizing capacity and heat transferability.

Another object of my invention is to provide a heating cylinder for an injection molding machine which makes shots at a rate "rate of shot" capacity when operated at an optimum cycle with high resistant plastic material.

Another object of my invention is to provide a novel heating cylinder for an injection molding machine which may utilize existing elements of an injection molding machine without modification of the existing equipment, with interchangeability between other heating elements, nozzles, and other related elements.

Another object of my invention is to provide a heating unit for an injection molding machine wherein different zones thereof may be individually controlled and any one of which may be operated at an optimum molding temperature.

Another object of my invention is to provide a heating unit or cylinder for a plastic injection molding machine which requires a minimum time for repair and replacement and assembly and disassembly.

Another object of my invention is to provide a heating cylinder with a uniform external diameter which will permit heating elements to be maintained thereon in predetermined longitudinal positions.

Another object of my invention is to provide a heating cylinder for an injection molding machine made of a material having a high fatigue resistance, good heat treating properties, and excellent weldability so that the parts thereof can be easily welded and machined.

Another object of my invention is to provide a heating cylinder for an injection molding machine comprising interlocking sections which cannot be misaligned or distorted, thereby minimizing the danger of a poor seal between the elements of the heating cylinder.

Another object of my invention is to provide a heating cylinder for an injection molding machine which has a maximum rate of heat transfer from the heating element of the heating cylinder to the plastic material in the heating cylinder.

Another object of my invention is to provide a heating cylinder for an injection molding machine which provides a minimum operation of control instruments to maintain a given heat.

Another object of my invention is to provide a heating unit for an injection molding machine which minimizes temperature changes from the predetermined heat, thereby permitting close control of heating cylinder temperature.

Another object of my invention is to provide a heating cylinder for an injection molding machine which permits color changes of molding material to be quickly and readily made in the heating cylinder, which permits easy flushing out of one material and change to another, which permits a steadier rate of plunger travel, and which makes the rate of cavity filling more constant and rapid since the plunger does not hesitate when it strikes the new cold material and begins to push it into the spreader zone.

Another object of my invention is to provide a heating cylinder for an injection molding machine which improves the physical characteristics of the molded product.

Another object of my invention is to provide a heating cylinder for an injection molding machine which provides a maximum production rate with high heat resistant material.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
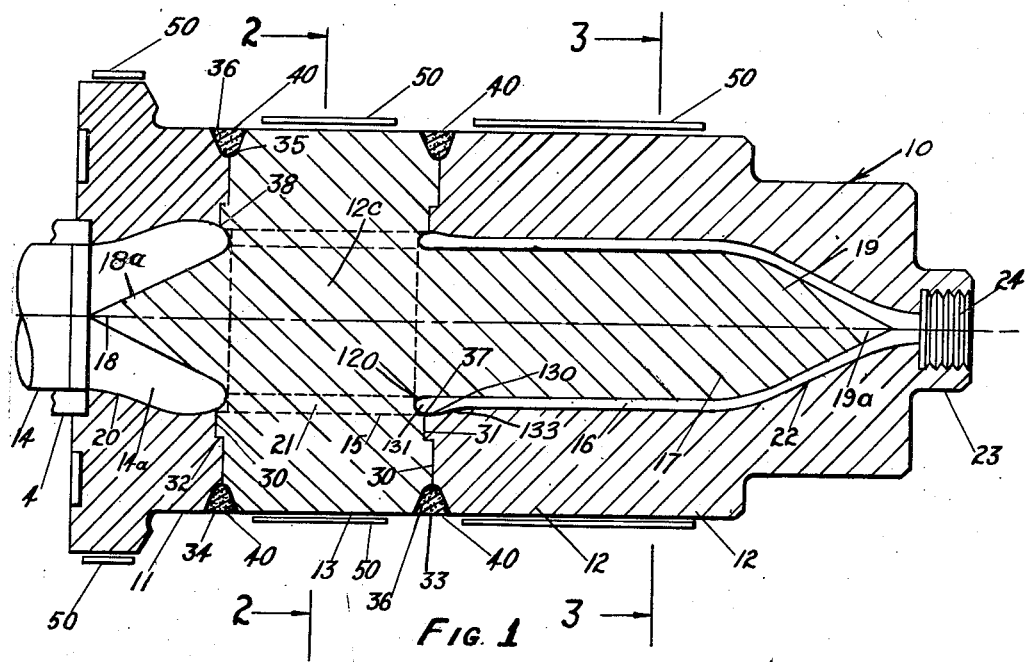
Fig. 1 is a side elevational view in cross section showing my novel heating unit.
Figure 2:
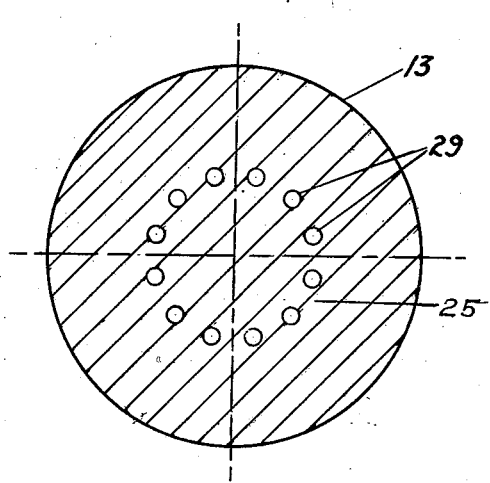
Fig. 2 is a view taken on the line 2—2 of Fig. 1.
Figure 3:
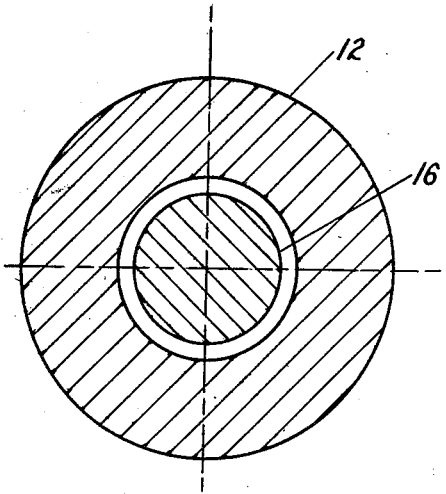
Fig. 3 is a view taken on line 3—3 of Fig. 1.

Referring now to the drawings, I show in Figs. 1, 2, and 3 a heating cylinder for use on an injection molding machine. A heating cylinder 10 comprising a flanged section 11, a front or nozzle section 12, and an intermediate or spreader section 13 is shown. The sections 11, 12, and 13 have aligned bores 14a, 15, and 16, respectively, forming a passageway 21 whereby moldable material may be forced therethrough. A cylindrical spreader 17 is disposed concentrically and longitudinally in the cylinder 10 and it is spaced from the inner sides thereof, thereby providing the passageway 21 between the outer side of cylindrical spreader 17 and the inner side of the sections 11, 12, and 13. The spreader 17 is connected to the spreader section 13 by a series of integral webs 25. The ends 18 and 19 of the spreader 17 are tapered to points 18a and 19a, respectively, and the bores 14a and 16 in the sections 11 and 12 are also tapered at 20 and 22 to approximately the same degree as the tapered ends 18 and 19 of the spreader 17. It will be noted that the cross sectional area of the bore 14a is several times the cross sectional area of the bore 16 in the section 12 at the discharge end of the heating cylinder 10. The nozzle section 12 of the heating cylinder 10 has a reduced end 23 with an internally threaded counterbore 24 for receiving the threaded end of a conventional injection nozzle.

The material utilized in making the sections 11, 12, and 13 is one which has a high fatigue resistance, good heat treating properties, and excellent weldability. Since a heating cylinder is under extreme pressure and temperature, the material must have a high fatigue resistance and good weldability of the material is particularly necessary to carry out my invention. By using the all welded construction of my invention to avoid assembly and disassembly problems now encountered in present conventional heating cylinders which use bolts to hold parts in assembled relation, the necessity of destroying the bolts which become distorted in use in order to disassemble the cylinder and the difficulty in replacing the bolts are eliminated.

The intermediate section 13 has a solid core 130 with the spaced apertures 21 formed therein and a groove 120 is cut in the face of the intermediate section. The inside surface 130 of the hollow of the nozzle section merges into the inside surface 131 of groove 120, thereby forming a tight joint and preventing plastic material from being trapped therein. The interlocking portions 30 overlie the corresponding flanges on the nozzle portion. Since the core 12c reinforces the intermediate section, little relative movement will result at the joint which would draw plastic material into the joint where it would burn and later contaminate the stream of material being molded. The bore through the nozzle section is counterbored at 133 so that it is larger than the remainder of the cylindrical portion of the bore. Therefore, the space between the spreader at the counterbore 133 is greater than the space between the spreader and the nozzle section at points spaced from the counterbore and, therefore, spaced from the groove 120. The outwardly extending shoulders 30 are formed on each side thereof for interlocking engagement with overhanging portions 31 and 32 on the sections 11 and 12. The three sections 11, 12, and 13 are pre-loaded axially in a hydraulic press and then welded at 40. Obviously, this method of welding could be used on other type heating cylinders and pressure could be applied by other means. The shoulders 30 on the intermediate section 13 take most of the lateral or bursting load so that the weld 40 takes only the axial tension load. During welding, the interlocking portions 30, 31, and 32 prevent misalignment or distortion of the members or sections 11, 12, and 13, thus minimizing the danger of a poor seal between the sections 11, 12, and 13 of the heating cylinder 10. The interlocking shoulders 30 and overhanging portions 31 and 32 on the sections 11, 12, and 13, respectively, also initially align the sections for welding.

Annular grooves 33 and 34 are formed on the outer peripheral edges of the engaging portions of the sections 11, 12, and 13 to define rounded annular troughs 35 for receiving a welding material 36 to weld the sections 11, 12, and 13 together.

If burning or other corrosive action should eventually occur at the joints 37 and 38 between the sections 11, 12, and 13, my novel heating cylinder 10 can readily be repaired by the simple expedient of turning out the welding material 36, refacing the sections 11, 12, and 13 at the joints 37 and 38, and re-welding the assembly. The expense of disassembling my novel heating cylinder, turning out the welds, and performing any overhaul operations thereon ordinarily costs half the expense for similar work on existing heating cylinders.

The webs 25 between the holes 29 integral with the spreader 17 and the intermediate section 13 of the heating cylinder 10 are of sufficient size so that sufficient heat will be transferred to the spreader 17 from resistant heating elements 50 disposed around the sections 11, 12, and 13. Sufficient heat from the resistance heating units coupled with the friction of the material flowing through the axially extending passageways 21 in the cylinder 10 will raise the temperature of the entire spreader 17 to nearly the surface temperature of the inside surface of the cylinder 10 itself. The length of the web 25 has a definite bearing on the ability of the heating cylinder 10 to transfer heat to material passing therethrough at a satisfactory rate.

The heating elements for use with my novel heating cylinder are preferably powder backed bands because they are now in general use and this type of band is available in practically all plastic processing shops. Mica insulated types and other suitable types of heating units may be used without departing from the spirit of my invention.

With the use of my novel heating cylinder, it is possible to heat approximately eighty-five percent of the circumference of the heating cylinder whereas only sixty-five percent of the cylinder is heated in existing heating cylinders, especially where the outer surface thereof is stepped longitudinally.

My heating cylinder 10 may be grooved to receive triangular Calrod type heating units and it may be encased in a jacket of copper or the like to insure greater conductivity from the source of heat to the walls of the heating cylinder.

In the operation of an injection molding machine with my novel heating cylinder, molding material is selectively forced through the bore 14a in the section 11 by the reciprocating plunger 14. The material is forced through the entrance end 4 of the longitudinally extending passageway 21 surrounding the spreader 17. The spreader 17 is heated to substantially the same heat as the sections 11, 12, and 13 of the heating cylinder 10 through the web 25 integral therewith and with the intermediate section 13 of the heating cylinder 10. The molding material generates heat because of frictional engagement with the outer surface of the spreader 17 and the inner surface of the passageway 21 in the section 11 and this, in addition to the heat from the spreader 17 and sections 11, 12, and 13 of the heating cylinder 10, plasticizes the material so that by the time it reaches the web 25, it has commenced to soften, thereby minimizing the force on the web 25. It is necessary to place the web 25 fairly close to the entrance end of the heating cylinder 10 inasmuch as this is where the material which is hard and cold comes into the heating cylinder 10 and often there is material in the bottom of the bore 14a in the section 11 so that more material is forced under the pointed end 19 of the spreader 17 than on the top thereof, thereby moving the end of the spreader upwardly. The webs 25 prevent axial misalignment of the spreader 17. The tapered ends 18 and 19 of the spreader 17 are rather sharp so as to minimize frictional resistance to the passage of molding material through the passageway 21 in the heating cylinder 10. There is a considerable reduction in the pressure required to force material through my novel heating cylinder in comparison with conventional heating cylinders.

It will be evident that I have provided a novel heating cylinder which may be installed in any conventional injection molding machine; may utilize conventional heating elements now in stock in injection molding plants; is especially adaptable for processing high heat resistant plastic material such as polystyrene, acetatestyrene, acrylics, polyethylene, the vinyls, and other high heat resistant plastic materials; has a minimum resistance to the passage of the plastic material therethrough; has a novel welded construction; permits easy assembly and disassembly and easy rebuilding, replacement and repair; requires a lower cylinder temperature to produce better results than existing heating cylinders; is capable of running full capacity shots at a rated "weight of shot" capacity and at an optimum cycle with respect to the piece being molded; permits closely controlled temperature zones from one end of the heating cylinder to the other; eliminates bolts, sleeves, and other elements now used in heating cylinders; has a maximum transfer of heat from the heating elements to the spreader; has novel means of welding whereby the welded portion may be quickly turned out so that the heating cylinder may be reconditioned; has a minimum number of cold spots; has a minimum variance from a predetermined set heat; permits a steadier rate of plunger travel due to the uniform plasticizing of the material, thereby making the rate of cavity filling more constant and rapid since the plunger does not hesitate when it strikes the new cold material and begins to push it into the spreader zone of the heating cylinder; permits increased production; greatly decreases the down time of injection molding machines, thereby greatly increasing the efficiency thereof; gives a uniform heat dispersion; has novel means such as turned shoulders to take the radial pressure load of the heating cylinder;

has a novel construction and arrangement of parts to greatly decrease its cost in manufacture and assembly and disassembly; and may be interchanged with conventional heating cylinders now used in injection molding machines. In the foregoing specification, I have set forth the invention in its preferred practical forms but I am aware that the structure shown is capable of modifications within a range of equivalents without departing from the invention which is to be understood is broadly novel as is commensurate with the appended claims.

What I claim is:

1. A heating cylinder for an injection molding machine comprising a hollow flanged section having an end portion attached to an intermediate section, a hollow nozzle portion attached to said intermediate section, heating means for said sections, said intermediate section having a solid core having spaced holes therein, one end of said holes terminating adjacent the inner periphery of said flange portion and the other end of said holes terminating adjacent the inner periphery of said nozzle section hollow, an elongated cylindrical spreader integrally attached to one end of said intermediate section and extending into the hollow in said nozzle section providing an annular passage for plastic material between said spreader and said nozzle section, said elongated spreader terminating in a conical point adjacent the discharge end of said nozzle section, means to heat said intermediate section, means separate from said intermediate means heating section to heat said nozzle section to a higher temperature than said intermediate section, and a groove disposed in the end of said intermediate section adjacent said nozzle section, the ends of said holes terminating in said groove, said groove and the space between said spreader and said nozzle section adjacent said groove being wider than the space between said spreader and said nozzle section remote from said groove, the bottom of said groove being generally arcuate in cross section and the outer edge thereof defining the inside edge of a portion concentric to said spreader, said inner edge of said portion merging into and registering with the inner surface of said hollow nozzle section whereby a smooth surface at the joint therebetween is provided, the cylindrical portion of said spreader extending beyond said intermediate section.

2. The heating cylinder recited in claim 1 wherein said portion on said end of said intermediate section has an end surface extending outward and then axially to form a shoulder overlying a shoulder on said nozzle section whereby relative movement of the walls of said nozzle section and said intermediate section is restrained.

References Cited in the file of this patent

UNITED STATES PATENTS

| | | |
|---|---|---|
| 2,360,417 | Grenfell | Oct. 17, 1944 |
| 2,367,144 | Shaver | Jan. 9, 1945 |
| 2,419,243 | Allen et al. | Apr. 22, 1947 |
| 2,431,843 | Swoger | Dec. 2, 1947 |
| 2,546,458 | Launder | Mar. 27, 1951 |